UNITED STATES PATENT OFFICE.

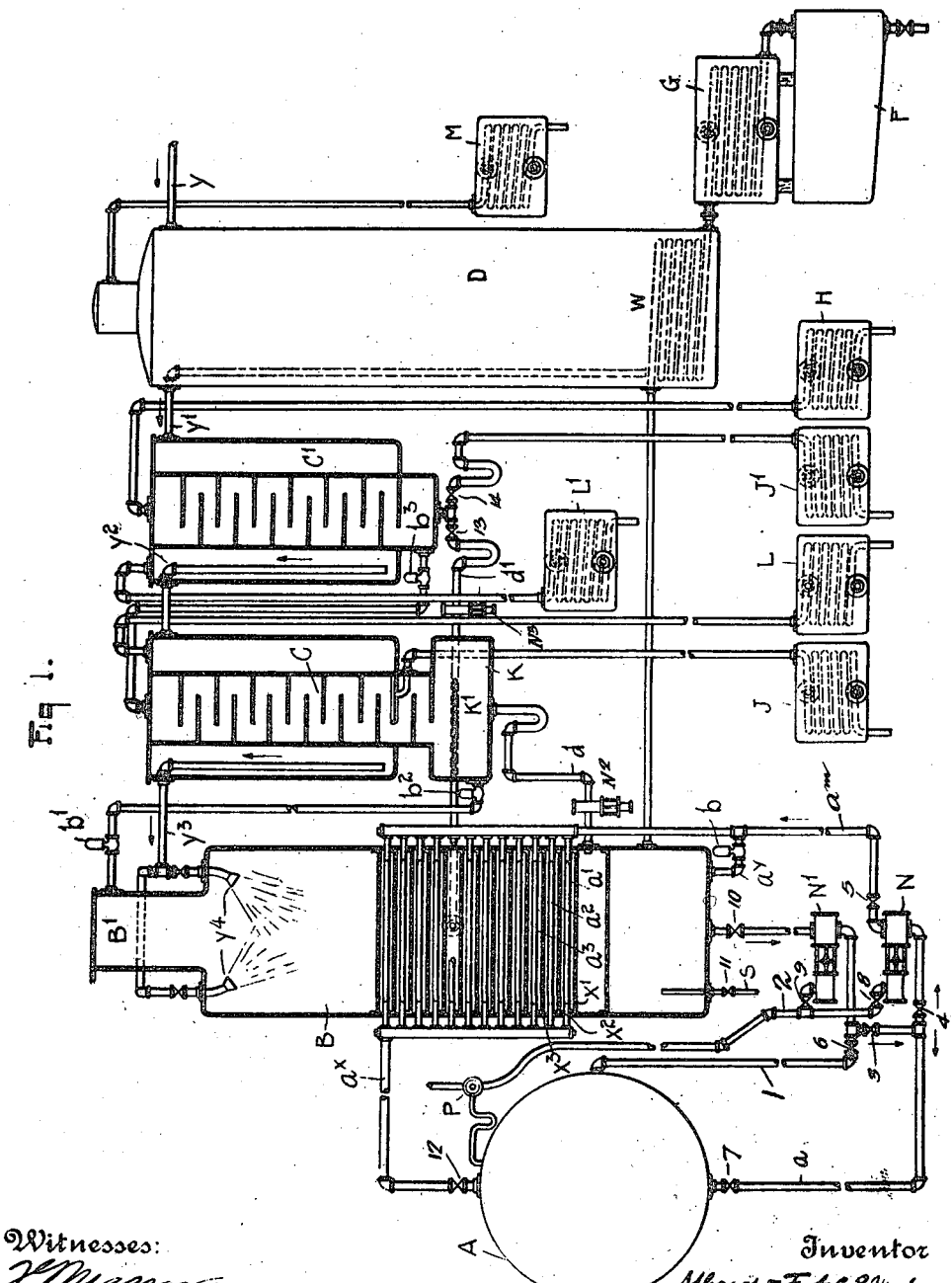

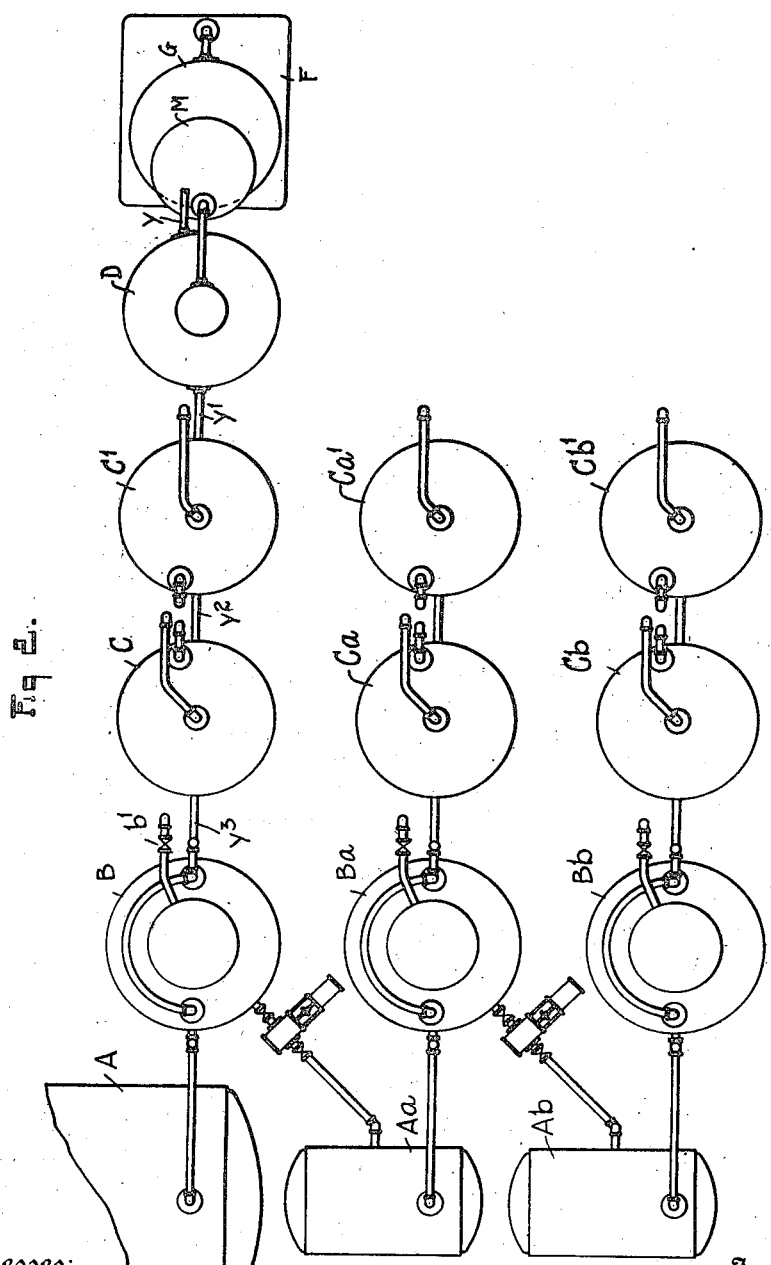

ALBRECHT FRIEDRICH GEORG PAIL JOSEF von GROELING, OF COFFEYVILLE, KANSAS, ASSIGNOR TO ATLAS PROCESS COMPANY, INC., OF NEW YORK, N. Y., A CORPORATION OF NEW YORK.

PROCESS OF AND APPARATUS FOR DISTILLING CRUDE OIL AND OTHER HYDROCARBONS.

1,295,088. Specification of Letters Patent. Patented Feb. 18, 1919.

Application filed April 23, 1915. Serial No. 23,411.

*To all whom it may concern:*

Be it known that I, ALBRECHT F. G. P. J. VON GROELING, a subject of the Emperor of Austria, and a resident of Coffeyville, in the county of Montgomery and State of Kansas, have invented a certain new and useful Process of and Apparatus for Distilling Crude Oil and other Hydrocarbons, of which the following is a specification.

This invention relates to processes and apparatus for distilling crude oil and other hydrocarbons; and it comprises, briefly, as a process, a process of distilling such oils by heating part of the same under pressure and utilizing the highly heated oil under pressure for combining with the oil in the still by introducing the same through a pressure reducing or expansion valve so that the highly heated oil, upon reduction in pressure is vaporized and acts upon the oil in the still, or for both heating the still and for combining with the oil therein; it also comprises such a process in which the oil flowing to the still and the distillate therefrom are brought into heat interchanging relation with each other in opposite directions whereby the distillate is cooled and condensed and the oil preheated and freed from its more volatile constituents before reaching the still; and as an apparatus it comprises a still provided with an inlet for the oil to be distilled and an outlet for the distillate therefrom, said still having therein heating coils arranged between trays or baffles forming separate chambers, a boiler for heating part of the oil under pressure, means for introducing oil from the still into the boiler and for circulating the heated oil from the boiler through the heating coil, and means including a pressure reducing valve or expansion valve for introducing part of the heated oil into the still; it also comprises certain novel combinations of such apparatus with dephlegmators, preheaters, etc., whereby the heat of the still distillate is utilized in preheating the oil with resulting advantage and economy; and it further comprises certain novel steps and combination of steps of the process, and certain novel combinations and arrangements of the apparatus; all as more fully hereinafter set forth and as claimed.

In the distillation of crude oils it is important that the oil should be separated into certain more or less distinct fractions. In some cases the more volatile petrol or gasolene, or even kerosene, fractions only are removed, leaving the fuel oil which may or may not be further separated. Again it may be desirable to carry out the fractionation more completely and separate the oil into further fractions, and particularly to break up the heavier oils into the more valuable lighter fractions. When treating crude oil near its source it is necessary to treat large amounts of oil continuously, and in many cases only a rough fractionation is effected, such as the removal of the lighter fractions from the fuel oil, and of the fuel oil from the lubricating oil, etc.

It is an object of the present invention to simplify the distillation of such oils, and to obtain in a single apparatus and with a continuous process an efficient and inexpensive separation of the oil, and certain valuable products. It is a further object of the invention to utilize the heat of the main still distillate for preheating the crude oil and for separating therefrom its more volatile constituents, so that the complete process can be effected by the heat supplied to the main boiler and still, and so that there will be a gradual increase in temperature of the oil entering the apparatus and a progressive fractionation thereof, and also so that there will be a progressive condensation of the distillate and separation thereof into the desired fractions, the temperature of the apparatus being gradually increased or decreased in successive stages of the process and apparatus from the temperature of the crude oil and condensed distillate to the intense heat of the boiler and still. Other objects of the invention will appear from the following more detailed description.

I will now proceed to describe my invention more in detail with particular reference to the accompanying drawings illustrative of certain embodiments of the apparatus of the invention, in which the novel process of the invention can be practised, it being intended and understood that the invention will be illustrated by, but is not limited to, the specific embodiments thereof so illustrated and described.

In the accompanying drawings Figure 1 shows more or less diagrammatically a partial elevation and partial vertical section of apparatus embodying my invention; and Fig. 2 shows a plan view of the apparatus shown in Fig. 1 and also shows similarly other boilers, stills, dephlegmators, etc., arranged to coöperate with the first series of apparatus.

This apparatus comprises a boiler A arranged to be suitably heated to the desired temperature by any suitable heating means (not shown) and constructed to withstand the pressure to which the oil within it may be subjected. The still in which the main distillation is effected is illustrated at B, and a series of dephlegmators (consisting of two dephlegmators in the particular construction shown) are illustrated at C and C', these dephlegmators being so connected with the still B that the distillate from the top of the still is led first to the bottom of the dephlegmator C in which is arranged a baffle chamber K for separating heavier particles, thence up through the dephlegmator C, from the top thereof to the bottom of the dephlegmator C', from the top of which the uncondensed distillate is led to a condensing coil H, and is condensed therein and collected as it flows therefrom. A preheater is shown at D, arranged to be heated by a coil W which receives the residue from the bottom of the still B; such residue passing from the coil W to the cooler G and finally to the residue tank F. The crude oil is fed into the preliminary heater D through the inlet pipe $y$, this feed being effected, preferably continuously, by a pump or in any suitable manner. From the preliminary heater the oil overflows through the pipe $y'$ to the jacket of the dephlegmator C'; from which jacket it flows by the pipe $y^2$, leading from near the bottom of the jacket, to the jacket of the dephlegmator C, from which it flows through the pipe $y^3$ and the spray nozzles $y^4$ into the top of the still B. A suitable condenser M is provided to condense the vapor produced in preheater D, and other suitable condensers L and L' are provided for condensing the vapor produced in the jackets of dephlegmators C and C'. Suitable coolers J and J' are also provided for cooling the liquid escaping from the lower levels of the dephlegmators C and C' respectively. Return pipes $d$ and $d'$ connect the bottoms of the dephlegmating columns C and C' respectively with the still B, the return pipe $d$ entering near the bottom of the still and the return pipe $d'$ entering at an intermediate point. Pumps $N^2$ and $N^3$ are provided in these return lines $d$ and $d'$ to force the residues in these dephlegmators into the still. From the bottom of the still B a pipe connection $c$ leads to a pump N' which pumps the oil under pressure into the boiler A, this pump being constructed and arranged to maintain the desired predetermined pressure within the boiler. Also connected with the boiler A is a pipe $a$ leading from the bottom of the boiler to a pump N and a pipe $a^m$ leading from the pump N to a series of coils $a'$, $a^2$, $a^3$, etc., from which the pipe $a^x$ leads back to the top of the boiler. Between the pipe $a$ and the bottom of the still B is a connection $a^y$ having therein a suitable pressure reducing or expansion valve $b$ by means of which the high pressure oil in the pipe $a$ can be introduced at a lower pressure into the bottom of the still. The coils $a'$, $a^2$, etc., are arranged within the still between perforated trays or baffles $x^1$, $x^2$, $x^3$, etc., which divide the central part of the still into separate chambers, each containing one of the heating coils. It will be understood that suitable valves such as 3—12 inclusive are provided where desired for controlling the flow of the oil or of the distillate and for maintaining the desired pressure conditions within the apparatus, thus the outlet for the distillate from the top of the still B may be provided with a regulating or reducing valve $b'$; and the other inlet and outlet connections may be similarly arranged to enable the desired pressure to be maintained within the still. A valved steam inlet $s$ is indicated at the bottom of the still through which steam can be introduced when desired.

The operation of the apparatus above described, and the process as practised therein will now be described. Assuming that the apparatus is to be started and that it does not contain any oil, the crude oil will be pumped continuously through the inlet $y$ to the preliminary heater D from which it will overflow into the jackets of the dephlegmators or preheaters C' and C and thence into the still B by means of the pipe connections $y^1$, $y^2$, $y^3$, and the spray heads $y^4$. The preheaters D, C, and C' will be filled to the level of the overflows. In the still B the oil passes down over the baffles or sieves and drips down to the bottom of the still. From the bottom of the still it is fed by the pump N' and pipe 1 into the boiler A until the desired level is obtained therein; in practice, the boiler A is filled, nearly or completely. The boiler A is then heated, and since there is no outflow while the oil is being pumped in, (until out-flow through valve $b$ starts, as hereinafter described, at which time oil is pumped into the boiler through pump N' to maintain the pressure) a pressure will be maintained sufficient to keep the oil in a liquid condition even when heated considerably above its boiling point at atmospheric pressure. In this way, the oil in the boiler may be heated to a cracking temperature, and yet maintained in that boiler in a liquid condition, owing to absence of vapor space in the boiler in which that oil may vaporize. The pump N is started and circulates the heated liquid through the pipes $a$, $a^m$, $a^1$, $a^2$, $a^3$, etc., and $a^x$, taking the oil from near the bottom of the boiler A and forcing it up through the coils within the still B to the top of the boiler A. When the pressure within the pipe system $a$ is greater than that at which the relief valve $b$ is set, part of the oil will be discharged through this valve $b$ and the pipe $a^y$ into the still and will be vaporized at the lower pressure within the still. Accordingly, when the apparatus is in continuous operation, a discharge of the heated oil from the high temperature and pressure of the boiler A and of the pipes $a$ and $a^m$ will be continuously effected through the reducing valve $b$, while at the same time circulation of the highly heated and high pressure oil will be effected from the boiler through the heating coils $a^1$, $a^2$, etc., arranged in the still B. The pressure within the boiler will be maintained automatically by means of the pump N' which is controlled by an automatic pressure-controller P controlling supply of steam through pipe 2 to this pump in such manner that it will operate to pump oil into the boiler or into the pipe system $a$ as soon as the pressure within the boiler falls below a predetermined amount. The pressure within the boiler is advantageously such that the oil will be maintained in a liquid state and distillation or vaporization prevented, notwithstanding the temperature to which that oil may have been raised; and in addition, it is preferable that the oil fill the boiler substantially completely, so that there may be no space therein in which vapor may form. The temperature of the oil will accordingly correspond to this pressure, and this temperature may be considerably higher than that within the still, so that when the oil is discharged through the reducing valve $b$, the reduction in pressure as the oil passes from valve $b$ into the still will result in converting a greater or less amount of this oil into vapor, which vapor will itself rise in the still and will tend to vaporize and carry with it more or less of the oil in the bottom of the still, particularly the more volatile constituents. If the oil in the boiler has been heated to cracking temperature, as may be the case, and has remained at such temperature for the time required for cracking, then upon the discharge of the oil from pipe $a^y$ into the still, the several fractions into which the oil has been cracked will evaporate more or less successively. The vapors rising in the still will meet the downflowing oil, heating it, dissolving it, combining with it, dephlegmating it, and distilling it. The rising vapors and the descending liquid will be intimately intermingled by the sieve-like baffles $x^1$, $x^2$, $x^3$, etc., and the mixture will be further heated and vaporized by the heating coils arranged in the chambers between the baffles. The result of the action taking place in the still is to give an oil residue at the bottom of the still having a relatively higher boiling point, and to give a distillate having a relatively lower boiling point. The vapors rising in the still collect in the dome B' and then pass on first to the dephlegmating column C, entering this column at the bottom and being first deflected by a baffle K' within separator K; upon which separator the dephlegmating column C is mounted. By means of this baffle the heavier particles and those mechanically carried along are separated and caused to settle at the bottom in the form of liquid which is returned by the return pipe $d$ to the still. From the separator K the vapors pass up through the main column C where they are in part condensed by the cooling action of the surrounding oil, the condensed distillate being drawn off from the lower levels to the condenser J. From the top of the column C the vapors pass through the bottom of the column C' where a further separating and dephlegmating action takes place. From the bottom of this column the condensed liquid can be either returned to an intermediate chamber of the still B or led to the condenser J', suitable regulating valves 13 and 14 being provided for regulating such flow. From the top of the column C' the uncondensed vapors pass to the condenser H. During the passage of the distillate through the columns C and C', in which columns the gases are baffled and made to take a circuitous path, they give up heat to the surrounding incoming oil which is thereby preheated. It will thus be seen that the distillate is progressively cooled and condensed while the incoming oil, flowing in the opposite direction, is progressively heated, the incoming oil thus acting as a condenser for the distillate, and the distillate acting to preheat the incoming oil. The incoming oil will be first preliminarily heated in the preheater D by the residue from the bottom of the still, and will then be further and successively heated in the jackets of the dephlegmators. I do not limit myself to any particular number of dephlegmators in the series; a greater or less number may be used, and the degree of fractionation obtained will depend in large measure on the number of such dephlegmators used. Moreover, preheating of the crude oil, in preheater D and in the jackets of the dephlegmators, and the preliminary distillation of the more volatile constituents from the incoming oil, is effected without any application of heat other than the heat of the distillate. From the tops of the various preheaters the more volatile fractions or constituents of the crude oil will be progressively removed, a preliminary fractionation of the crude oil being thus effected, with the result that the crude oil is "topped" or separated from the more volatile by-products which form in themselves valuable constituents of the oil, but which are not desired in oil used for fuel and other purposes. From the various condensers the products obtained can be led to any suitable retainers or storage receptacles. It will be understood that the various condensers and coolers can be cooled by crude oil as well as by water, and that the crude oil can be thereby further heated, suitable connections being provided for circulating the crude oil and recovering any volatilized constituents. The residue which accumulates in the main still B will be of a relatively higher boiling point, and this residue can be subjected to further treatment in any desired manner. Such residue may advantageously be further treated in a further still $B^a$ (Fig. 2) in which it is introduced at the top, and in which it is heated and further fractionated or treated in much the same manner as is the oil in the still B. A series of such stills, B, $B^a$, $B^b$, etc., (Fig. 2) each having its appropriate dephlegmators C, C', or $C^a$, $C^{a\prime}$, or $C^b$, $C^{b\prime}$, etc., can be connected together so that all fractions from the highest to the lowest, or from the lightest to the heaviest, can be obtained from a single apparatus, suitable pump connections being made for effecting the circulation from each still into the next and for removing from each still the various fractions formed therein. When a plurality of such stills are used together, each may have its separate boiler, A, $A^a$, $A^b$, etc., maintained under the necessary heat and pressure, and operated in a manner already described. With such a series, the crude oil can be treated to obtain from it all its various fractions including the heavy lubricating oil and the pitchy residue.

Where it is desired to use the apparatus for cracking purposes, the pressure within the still B can be increased by providing the outlets therefrom with suitable regulating valves such as 7, 3 and 4, and by introducing the oil therein under pressure. In such case the pressure and temperature of the boiler A may advantageously be higher than that of the still so that the heated oil from the boiler can still be expanded through the valve $b$ and vaporized within the still, and so that the heating coils within the still will still exert the desired heating action. A most intimate intermingling of the rising vapors and of the descending liquid is effected as they pass over the baffles and heating coils, and the rising vapors act not only to vaporize the oil but they combine within it and favorably influence the cracking process. The expansion of the high pressure and temperature gases into the still is also advantageous in the cracking process, since the relieving of the pressure, and the conversion of the liquid into a vapor at a high temperature, is advantageous in such process.

The process and apparatus of the present invention are of particular value where it is desired to separate from crude oil the main fuel fraction from the more volatile constituents on the one hand, and from the heavier residues on the other. The process is also advantageous for obtaining a larger yield of the liquid fuel. It will be understood that the different fractions obtained can be further purified and fractionated. Where the crude oils contain impurities such as sulfur, these will require subsequent purification. The process and apparatus of the present invention enable a rough separation of the crude oil to be advantageously effected by the application of heat at one point only and by the utilization of the heat of the main distillate for preheating the inflowing crude oil. The arrangement is such that the hottest distillate is used for heating the crude oil which has already been heated by the cooler distillate, and vice versa. When desired superheated steam can be introduced at the bottom of the still through pipe $s$ in addition to petroleum vapors through pipe $a^y$. Such addition of steam is desirable in some cases to sweeten the benzin or other fraction. The introduction of the petroleum vapors however is particularly advantageous in the operation of the process within the still since such vapors act chemically as well as mechanically and tend to split up the higher hydrocarbons molecules with increased yield of the more valuable lighter fractions. In some cases it may be advantageous to operate the different condensing or dephlegmating columns at progressively decreasing pressures, reducing valves $b^2$, $b^3$, etc., being provided. Also when a plurality of stills are used, in which the oil is successively treated, the temperature can be progressively raised, and different pressures can be maintained corresponding to the temperature in each apparatus. Since each of these vessels or stills may operate independently of the others, while still coöperating in the complete apparatus and process, a vacuum can be used with some of the stills in order to decrease the pressure therein, such decrease in pressure resulting in a larger difference in pressure between the oil in the boiler and the still into which the oil is expanded, and a greater tendency toward vaporization of the expanded oil. It will be understood also that a vacuum can be maintained through the stills and dephlegmators and the process as a whole carried out under a reduced pressure Suitable control valves 8 and 9 for pumps N and N' are provided; also valves 3, 4, 5, 7, 8, and 10 whereby the flow of oil through the pipes may be regulated and also the pressures controlled.

From the foregoing description it will be seen that the process and apparatus of the present invention enable a simple and inexpensive separation of the crude oil to be effected, either to obtain therefrom a few fractions only, such as the fuel oil separated from the lighter hydrocarbons and the heavier illuminating oil, or to obtain a complete separation of the crude oil into all the desired fractions, the number of dephlegmators and condensers and preheaters being varied within rather large limits as may be desired, and suitable air condensers being used when desired for separating the lubricating oils into different fractions. It will also be seen that heating of the oil is effected at only one point and that the heat for the remaining operations is derived from the distilled oils themselves. The process is thus simple and inexpensive in operation, and readily adapted to the fractionation and separation of crude oils widely differing in properties. Variations and modifications can be made in the process and apparatus as described and illustrated without departing from the spirit and scope of the invention, as set forth in the following claims.

This invention has for its object to simplify as far as possible the process and the apparatus for the distillation purposes proper, and at the same time to design the apparatus in such a manner that the heat supplied to the quantity of the product to be distilled, can be recovered as far as possible for the distillation purpose itself and for the preliminary heating of the material, that is to say, in such a way that the greatest economy may be combined with the lowest possible cost of installation.

What I claim is:—

1. The process of distilling crude oil and other hydrocarbons which comprises heating a portion of the oil under pressure, and reducing the pressure of the oil and introducing such oil into the oil to be distilled, whereby such oil is vaporized upon reduction of pressure and the distillation thereby effected.

2. The process of distilling crude oil and other hydrocarbons which comprises heating a portion of the oil above its normal boiling point and at a pressure sufficient to maintain the oil in a liquid state, and reducing the pressure of the oil and introducing such oil into the oil to be distilled, whereby such oil is vaporized upon reduction of pressure and the distillation thereby effected.

3. The process of distilling crude oil and other hydrocarbons which comprises heating a portion of the oil of relatively high boiling point under pressure above its normal boiling point and reducing the pressure of the oil and introducing such oil into the oil to be distilled, whereby such oil is vaporized upon reduction of pressure and the distillation thereby effected.

4. The process of distilling crude oil and other hydrocarbons which comprises heating a portion of the oil under pressure, circulating such heated oil into heating relation with the oil to be distilled, and introducing part of the heated oil into the oil to be distilled with reduction of pressure.

5. The process of distilling crude oil and other hydrocarbons which comprises heating a portion of the oil of relatively high boiling point above its normal boiling point under pressure, circulating such heated oil into heating relation with the oil to be distilled and returning the same to be further heated and circulated, and introducing part of the heated oil into the oil to be distilled with reduction of pressure.

6. The process of distilling crude oil and other hydrocarbons which comprises heating a portion of the oil above its normal boiling point and at a pressure sufficient to maintain the same in a liquid state, circulating such heated oil into heating relation with the oil to be distilled, and introducing part of such heated oil into the oil to be distilled with reduction of pressure.

7. The process of distilling crude oil and other hydrocarbons which comprises preheating the oil to be distilled and introducing the same near the top of the still, heating a portion of such oil under pressure and circulating such heated oil into heating relation with the oil in such still.

8. The process of distilling crude oil and other hydrocarbons which comprises preheating the oil to be distilled and introducing the same near the top of the still, heating a portion of such oil under pressure and circulating such heated oil into heating relation with the oil in such still and introducing part of such heated oil into the still near its lower end with reduction of pressure.

9. The process of distilling crude oil and other hydrocarbons which comprises preheating the oil to be distilled and introducing the same near the top of the still, drawing off oil from the bottom of the said still and heating the same under pressure to above its normal boiling point, and introducing such heated oil into the oil in such still with reduction of pressure.

10. The process of distilling crude oil and other hydrocarbons which comprises preheating the oil to be distilled and introducing the same near the top of the still, drawing off oil from the bottom of said still and heating the same under pressure to above its normal boiling point, circulating such heated oil into heating relation to the oil within such still, and introducing part of the heated oil into the oil in such still with reduction of pressure.

11. The process of distilling crude oil which comprises preheating such oil and removing therefrom the more volatile fractions by subjecting the same to the heating action of distillates resulting from the subsequent treatment, introducing the preheated oil freed from such more volatile fractions near the top of a still, drawing off from the still a part of the oil therein and heating the same under pressure, circulating such heated oil into heating relation with the oil in such still, and subjecting the crude oil to the heating action of the distillate from such still to effect the removal of the more volatile fractions therefrom.

12. The process of distilling crude oil which comprises preheating such oil and removing therefrom the more volatile fractions by subjecting the same to the heating action of distillates resulting from the subsequent treatment, introducing the preheated oil freed from such more volatile fractions near the top of a still, drawing off from the still a part of the oil therein and heating the same under pressure, introducing such heated oil into the oil in said still with reduction of pressure to effect distillation of the oil therein, and subjecting the crude oil to the heating action of the distillate from such still to effect the removal of the more volatile fractions therefrom.

13. The process of distilling crude oil which comprises preheating such oil and removing therefrom the more volatile fractions by subjecting the same to the heating action of distillates resulting from the subsequent treatment, introducing the preheated oil freed from such more volatile fractions near the top of a still, drawing off from the still a part of the oil therein and heating the same under pressure, circulating such heated oil into heating relation with the oil in such still, introducing part of such heated oil into the oil in said still with reduction of pressure, and subjecting the crude oil to the heating action of the distillate from such still to effect the removal of the more volatile fractions therefrom.

14. The process of distilling crude oil and other hydrocarbons which comprises preheating the oil to be distilled and introducing the same near the top of the still, baffling and spreading out such oil in its passage down through said still, drawing off from the bottom of such still a portion of the oil and heating the same under pressure to above its normal boiling point, circulating the heated oil into heating relation with the oil in such still while baffled and spread out therein, and introducing part of such heated oil with reduction of pressure into the oil in the bottom of said still.

15. The process of distilling crude oil which comprises preheating such oil and removing therefrom the more volatile fractions by subjecting the same successively to the heating action of distillates of progressively lower boiling point resulting from the subsequent treatment of such oil, introducing the preheated oil freed from such more volatile fractions near the top of a still, drawing off from the bottom of the still a part of the oil therein and heating the same under pressure, introducing part of the heated oil into the oil in the bottom of such a still with reduction of pressure, and thereby vaporizing part of the same and of the oil in such still, circulating part of such heated oil into heating relation with the liquid flowing down through said still and the vapors rising therein, and subjecting the crude oil flowing to said still in successive stages to the action of the distillate from such still to effect removal of the more volatile fractions therefrom.

16. A distilling apparatus comprising a still provided with an inlet for the oil to be distilled and an outlet for the distillate therefrom, a boiler for heating oil under pressure, means for introducing part of the oil from said still into said boiler under pressure, and means including a pressure reducing valve for introducing the heated oil from said boiler into said still.

17. A distilling apparatus comprising a still provided with an inlet for the oil to be distilled and an outlet for the distillate therefrom, a boiler for heating oil under pressure, means for introducing part of the oil from said still into said boiler under pressure, means including a pressure reducing valve for introducing the heated oil from said boiler into said still, and means for circulating part of said heated oil through said still to heat and distil the oil therein.

18. A distilling apparatus comprising a still provided with an inlet for the oil to be distilled and an outlet for the distillate therefrom, a boiler for heating oil under pressure, means for introducing part of the oil from said still into said boiler under pressure, means including a pressure reducing valve for introducing the heated oil from said boiler into said still, intermediate perforated partitions within said still forming chambers therebetween, heating coils in said chambers between said partitions and means for circulating heated oil from said boiler through said coils.

19. A distilling apparatus comprising a still provided with an inlet for the oil to be distilled and an outlet for the distillate therefrom, a boiler for heating oil under pressure, means for introducing oil from said still into said boiler under pressure, means including a heating coil for circulating the heated oil under pressure within said still, and a pipe connection from said coil to said still having a regulable pressure reducing valve therein for the introduction of said heated oil into said still at a lower pressure.

20. A distilling apparatus comprising a still provided with an inlet for the oil to be distilled and an outlet for the distillate therefrom, a boiler for heating oil under pressure, a pump connected with the bottom of said still and said boiler for feeding oil to said boiler and regulating the pressure therein, a heating coil connected to the boiler and arranged in said still for the circulation therethrough of heated oil, means including a pressure reducing valve connecting said heating coil with the bottom of the boiler for the introduction of the heated oil into said still at a lower pressure, and a pump for effecting circulation from said boiler through said heating coil.

21. A distilling apparatus comprising a still provided with an inlet for the oil to be distilled and an outlet for the distillate therefrom, means for maintaining said still under pressure, a boiler for heating oil under a pressure greater than that of said still, means for introducing oil from said still into said boiler under pressure, means including a heating coil for circulating the heated oil under pressure within said still, and a pipe connection from said coil to said still having a regulable pressure reducing valve therein for the introduction of said heated oil into said still at a lower pressure.

22. A distilling apparatus comprising a still provided with an inlet for the oil to be distilled and an outlet for the distillate therefrom, a boiler for heating oil under pressure, means for introducing part of the oil from said still into said boiler under pressure, means including a pressure reducing valve for introducing the heated oil from said boiler into said still, means for circulating part of said heated oil through said still to heat and distill the oil therein, and means for preheating the oil flowing into said still by the distillate therefrom.

23. A distilling apparatus comprising a still provided with an inlet for the oil to be distilled and an outlet for the distillate therefrom, intermediate perforated partitions within said still forming chambers therebetween, heating coils in said chambers between said partitions for the heating medium, a dephlegmator for subjecting the oil flowing to said still to the heating action of the distillate therefrom, a return pipe from the bottom of said dephlegmator to said still, a second dephlegmator for subjecting the oil flowing to said first dephlegmator to the heating action of the vapors from said dephlegmator, and a return pipe from said second dephlegmator to one of the chambers of said still.

24. A distilling apparatus comprising a still provided with an inlet for the oil to be distilled and an outlet for the distillate therefrom, means for heating said still, a series of dephlegmators arranged to condense successive fractions of the distillate of progressively lower boiling points, means for circulating the oil through said dephlegmators in the reverse direction before reaching the still, and means for subjecting the oil to the heating action of the still residue before it reaches the dephlegmators.

25. The process of distilling crude oil and other hydrocarbons which comprises heating a portion of the oil under pressure, reducing the pressure of the oil and introducing such oil into the oil to be distilled, and commingling heated water vapor with the oil being distilled, whereby such oil is vaporized upon reduction of pressure and distillation is effected in the presence of water vapor.

26. The process of distilling crude oil and other hydrocarbons which comprises heating a portion of the oil under pressure, reducing the pressure of the oil and introducing such oil into the oil to be distilled, whereby such oil is vaporized upon reduction of pressure and the distillation thereby effected, reheating the undistilled residue and treating it as specified above.

27. A process of treating hydrocarbon oils which consists in heating such an oil under pressure and in a closed and substantially filled chamber under cracking conditions, followed by quick reduction of pressure of such oil and introduction of the pressure reduced oil, or the vapors resulting from such pressure reduction, into another body of oil with resultant imparting of latent heat to the second body of oil and the distillation thereof.

28. A process of treating hydrocarbon oils which consists in heating such an oil under pressure and in a closed and substantially filled chamber under cracking conditions, followed by quick reduction of pressure of such oil and introduction of the pressure reduced oil, or the vapors resulting from such pressure reduction, into another body of oil with resultant imparting of latent heat to the second body of oil and the distillation thereof, and collecting and fractionating the resulting vapors.

In testimony whereof I have signed this specification in the presence of two subscribing witnesses.

ALBRECHT FRIEDRICH GEORG
PAIL JOSEF VON GROELING.

Witnesses:
CLYDE A. KING,
H. R. HEAL.